July 15, 1941.     H. A. FLOGAUS     2,249,273
COACH DOOR CONSTRUCTION
Filed May 9, 1938
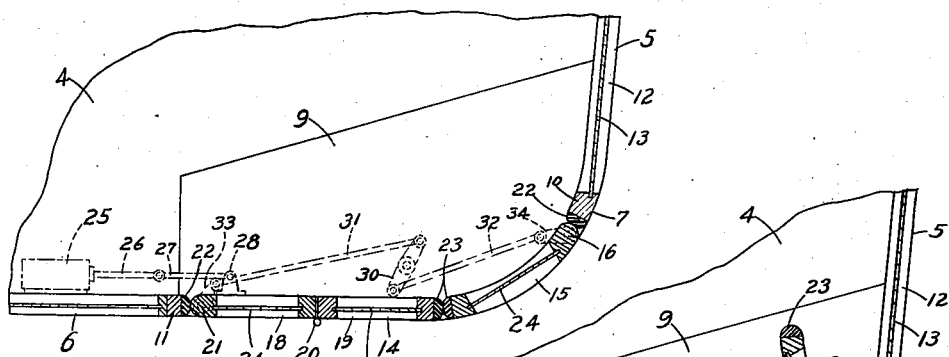
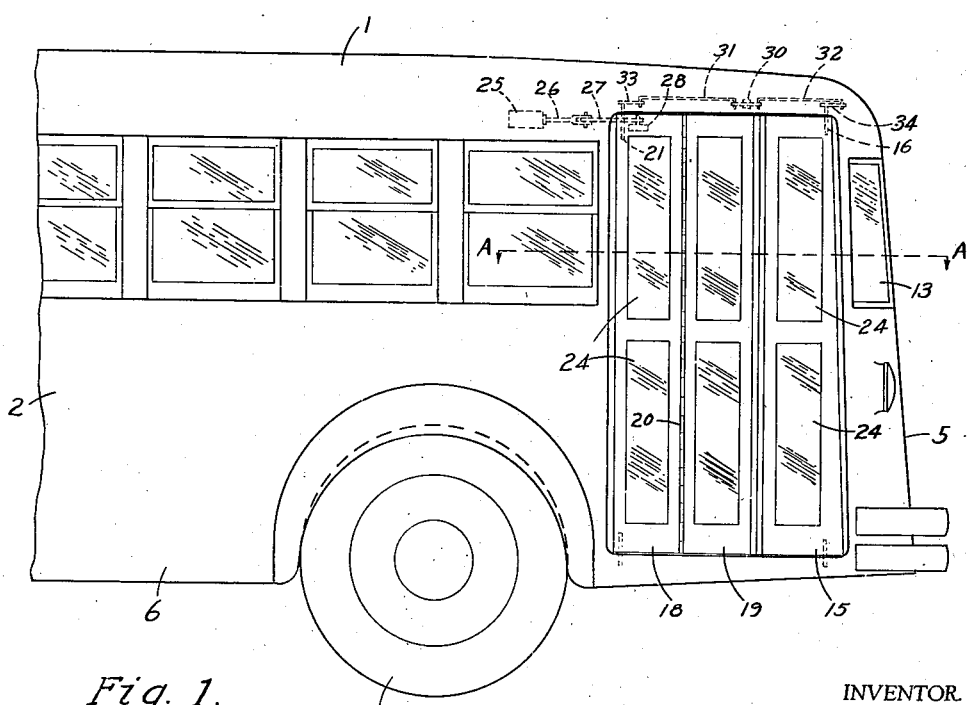
INVENTOR.
Howard A. Flogaus
BY
ATTORNEY.

Patented July 15, 1941

2,249,273

UNITED STATES PATENT OFFICE 2,249,273

COACH DOOR CONSTRUCTION

Howard A. Flogaus, Lansing, Mich., assignor, by mesne assignments, to Reo Motors, Inc., Lansing, Mich., a corporation of Michigan Application May 9, 1938, Serial No. 206,778

2 Claims. (Cl. 296—44)

This invention relates generally to vehicles and more particularly to doors for motor coaches or buses.

In vehicles of this character, the passenger door opening is generally located entirely in a side wall of the vehicle body adjacent the front or rear thereof and closed by a folding door usually comprising four hinged sections. In coaches having such doors positioned either forwardly of the vehicle front wheels or rearwardly of the rear wheels, an undesirably large portion of the vehicle body must necessarily overhang the front or rear axle which makes for an objectionable distribution of the weight of the body on the wheels. In addition, folding doors of the above character are expensive to manufacture, are heavy requiring a large motor to operate them and are not as durable nor as air-tight as desired.

Accordingly, it is an object of the present invention to provide a motor vehicle having a passenger door of a character and so arranged as to permit a material reduction in body overhang with respect to the vehicle wheels effecting a more equal distribution of the weight of the body on the wheels.

Further objects of the invention are to provide doors for a motor coach which are inexpensive to manufacture, are light in weight and easy to operate yet which are durable and substantially air-tight.

Other objects and advantages of the invention will become apparent from a reading of the following description taken in connection with the accompanying drawing in which:

Fig. 1 is a side elevational view of the front portion of a motor coach embodying features of the invention, Fig. 2 is a fragmentary view of the coach partly in section taken along the line A—A and in the direction of the arrows of Fig. 1 showing the door construction, and Fig. 3 is a view similar to Fig. 2 showing the doors in open position.

Referring to the drawing by characters of reference, the numeral 1 designates in general a motor coach having a body 2 mounted upon wheels 3, the body being of general rectangular shape formed in part by a floor 4, an end or front wall 5 and side walls 6, the side walls 6 joining with the front wall 5 in rounded corners 7.

In order to effect a material decrease in body overhang forwardly of the wheels 3 and still provide an adequate passenger entrance, the door opening 8, instead of being positioned entirely in a side wall of the body 2 in the usual manner, is formed partly in one of the side walls 6 and partly in the adjacent rounded corner 7 and front wall 5. At the door opening 8, the body 2 is provided with a step well 9 below the level of the floor 4 and the door opening extends vertically from the step well substantially to the top of the body as shown in Fig. 1.

The construction of the body at the door opening 8 may include two relatively spaced front and rear door posts 10 and 11 of which the front post 10 may also form one side of a windshield frame 12 in the front wall 5 and in which a transparent windshield 13 may be secured. A two-panel folding door 14 and a single, rigid or non-folding door 15 having transparent panes 24 cooperate to form a closure for the door opening 8, the panel 15 closing the portion of the opening in the rounded corner 7 and being curved to conform in shape thereto. When the doors 14 and 15 are closed, as shown in Fig. 2, the folding door 14 aligns with the body side wall 6 and with the door 15 which in turn is in alignment with the wall of the rounded corner 7 and with the front wall 5. Adjacent the front door post 10, the curved door 15 is pivoted as at 16 near its front longitudinal edge to the body 2 for swinging movement, the pivot 16 being located in the wall of the rounded corner 7.

The folding door 14 comprises two flat, rectangular panels 18 and 19 connected together by a hinge 20 and pivoted as at 21 adjacent the rear longitudinal edge of the panel 18 to the body 2 near the rear door post 11. A strip 22 of yieldable material such as rubber is secured to each of the door posts 10 and 11 to be engaged and compressed by the adjacent edges of the doors when closed and likewise the adjacent edges of the door panel 19 and door 15 are provided with similar strips 23 of flexible material which engage and compress to provide a substantially air-tight joint therebetween.

By providing the single panel door 15 in the body curve 7 rather than a conventional two panel folding door, it will be seen by reference to Fig. 2 that the vehicle operator's visibility is materially increased since the door 15 may be provided with relatively wide window panes giving unbroken vision between the front and rear side frames of the door.

An air cylinder 25 containing a piston (not shown) actuated by compressed air may be provided for opening and closing the doors 14 and 15 the operation of which may be remotely controlled by the vehicle operator through a manually operable air valve (not shown). The air cylinder 25 may be mounted on the body side wall 6 rearwardly of and above the door opening 8 and the piston rod 26 thereof may be connected through a link 27 to a bracket 28 secured to the door panel 18 adjacent the door pivot 21. The doors 14 and 15 may be operatively connected by a lever 30 pivotally mounted on the body 2 intermediate the door posts 10 and 11 and having two arms pivotally connected to links 31 and 32 which in turn are connected respectively to lever arms 33 and 34 fixed to the door pivots 16 and 21.

When, at the will of the operator, the piston in the cylinder 25 moves to the left, the door panel 18 of door 14 is swung inwardly about its pivot with a quick movement, the inertia of the panel 19 causing the door 14 to fold back against the adjacent side of the door opening 8, as shown in Fig. 3. At the same time that door 14 is moved to open position, the single panel door 15, through the connecting links 31, 32 and lever 30, is swung inwardly to its open position shown in Fig. 3. On reverse operation of the piston, the doors are swung outward, the door 14 unfolding and cooperating with the door 15 to close the door opening 8. If desired, the links 31, 32 and lever 30 which operatively connect the doors 14 and 15 may be arranged so that the doors will open outwardly, as shown in dotted lines, Fig. 3.

Due to the fact that the forward single panel door 15 is pivoted at the front of the body inwardly from the plane of the side wall 6 it will not project outwardly from the side of the vehicle as far as if it were pivoted to the body at the side wall. Thus when the door is opened at a passenger loading station, danger of striking a passenger standing on the platform is minimized.

By providing the door opening partly in the body side wall and partly in the front wall, the front wheels may be positioned closer to the front of the vehicle, thus reducing body overhang and increasing the wheel base of the vehicle providing improved riding qualities. The provision of only three door panels requires less material resulting in a more economical, lighter and more durable construction. Moreover, the use of a folding door and a single panel door rather than two folding doors eliminates one hinge which accomplishes a further saving in cost, reduction in weight and provides a more air-tight construction. In addition, since only one folding door is employed, the inertia of the driven panel 18 is reduced permitting the use of a less powerful operating means which results in still a further saving in cost and increase in the life of the mechanism.

What is claimed and desired to be secured by Letters Patent is:

1. In a vehicle body having a side wall and an end wall joining said side wall in a rounded corner and having a door opening therein extending into said side wall and end wall, a closure for said opening comprising a door member hinged at one edge to one of said walls adjacent an edge of the door opening, said door member consisting of two hingedly connected relatively movable sections, and a second door member consisting of a single section curved to conform to the rounded corner of the body and being hinged to the other wall adjacent the opposite edge of the door opening.

2. In a vehicle body having a side wall and an end wall joining said side wall in a rounded corner and having a door opening therein extending into said side wall and end wall, a closure for said opening comprising a door member hinged at one edge to one of said walls adjacent an edge of the door opening, said door member consisting of two flat hingedly connected relatively movable sections adapted when closed to lie in a common plane, and a second door member consisting of a single section curved to conform to the rounded corner of the body and being hinged to the other wall adjacent the opposite edge of the door opening.

HOWARD A. FLOGAUS.